(No Model.)
A. REUBOLD.
DEVICE FOR COOKING MEATS.
No. 508,759. Patented Nov. 14, 1893.
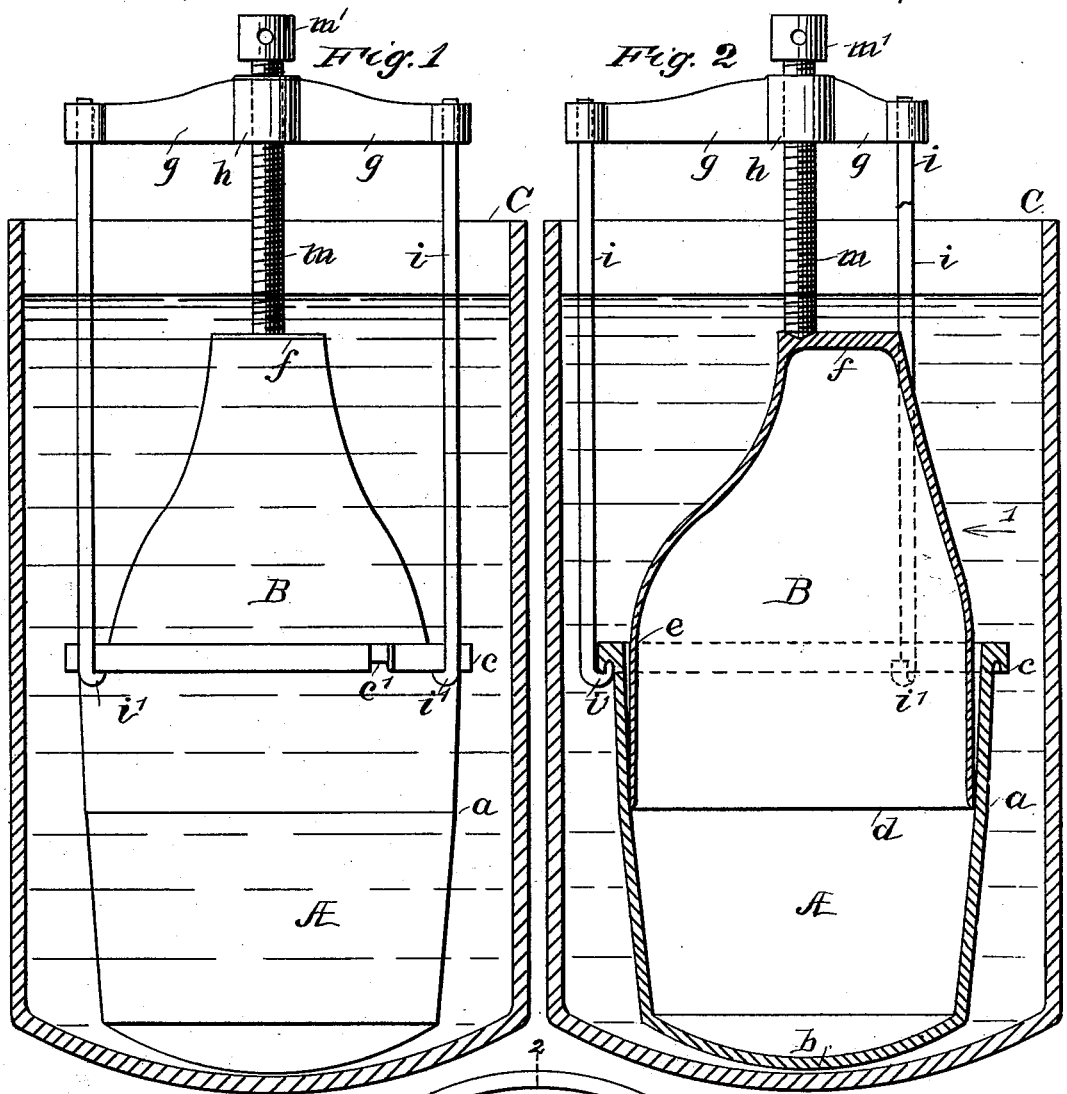
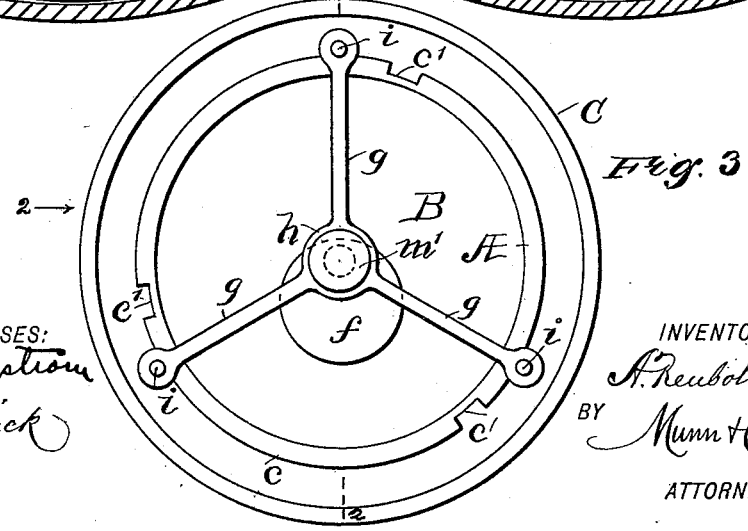
WITNESSES:
J. A. Bergstrom
C. Sedgwick
INVENTOR
A. Reubold
BY
Munn & Co
ATTORNEYS.
THE NATIONAL LITHOGRAPHING COMPANY,
WASHINGTON, D. C.

UNITED STATES PATENT OFFICE.

ADAM REUBOLD, OF NEW YORK, N. Y.

DEVICE FOR COOKING MEATS.

SPECIFICATION forming part of Letters Patent No. 508,759, dated November 14, 1893.

Application filed November 17, 1892. Serial No. 452,343. (No model.)

*To all whom it may concern:*

Be it known that I, ADAM REUBOLD, of New York city, in the county and State of New York, have invented a new and useful Device for Cooking Meats, of which the following is a full, clear, and exact description.

This invention relates to a novel means for cooking boned ham, shoulders of pork and other meats, and has for its object to provide a simple and economical cooker, which will preserve all the juices of the meat as well as its flavor, prevent shrinkage of the meat that has been cooked in the improved device, and increase its value as an article of food, the particular use for which the improved device is best adapted, being the cooking of boned hams and shoulders of pork, so as to preserve their form, juices and aroma.

To these ends, my invention consists in the novel construction and combination of parts of the cooking device, as is hereinafter described and claimed.

Reference is to be had to the accompanying drawings forming a part of this specification, in which similar letters of reference indicate corresponding parts in all the figures.

Figure 1 is a side view of the improvement located in a vessel shown in section, the point of sight being opposite the arrow 1, in Fig. 2. Fig. 2 is a view in section of the containing vessel and the cooker, taken on the line 2—2 in Fig. 3, in the direction indicated by arrow 2, in said figure; and Fig. 3 is a plan view of the improved cooker and the containing vessel.

The novel cooking device, consists in part of a metal receptacle A, which is cylindrical in form from its upper edge downwardly to a point $a$, that is a suitable distance therefrom. The bottom wall $b$, of the vessel A, is of less diameter than the cylindrical portion of the same, and is dished upwardly a proper degree, and from its edge the side wall is flared to join with the cylindrical part of the vessel at $a$, the entire receptacle being integrally formed of any suitable metal either by casting it into shape, or by other means. By preference, the upper edge of the vessel A, is externally return-bent, so as to produce a depending short flange $c$, thereon, sufficiently removed from the side of the vessel to afford a locking groove between its exterior surface and the flange, as shown in Fig. 2. There is a deep, hollow sealing cap B, provided for the vessel A, which when in position forms an upward extension for said vessel. By preference the cap B, is formed of metal pressed or cast into form which is substantially bell-shaped, and the portion of its wall that extends from the free lower edge $d$, is slightly and regularly converged for a proper distance. From the point $e$, where the regular contraction of diameter ends, the integral wall of the cap piece B, is more abruptly narrowed or diminished in width, and toward the closed upper terminal $f$ of the cap, its hollow body is formed at one side of the longitudinal axis of the lower conoidal part, thus adapting the vessel and its cap piece to nearly conform interiorly to the shape of a ham or shoulder of pork when these parts are connected as indicated in Fig. 2. The circular lower edge $d$ of the cap piece B, is of such a diameter as will allow it to slide freely within and loosely fit the cylindrical part of the vessel A, so that said edge may be seated upon the converging inner surface of the side wall portion of the vessel, below the point $a$, and form a water-tight joint therewith.

The preferred form for the clamping device provided to detachably secure the parts A and B together, comprises a frame having three spaced arms $g$, which radiate from a central hub $h$, said arms being perforated near their ends at a right angle to their lower flat sides. A depending clamping bar $i$, is secured in each arm where it is perforated, said bars having each a hook $i'$, formed on its lower end, which hooks point toward a common center. Three evenly spaced notches $c'$, are cut in the flange $c$, of a proper width and depth to freely permit the passage of the hooked ends $i'$ of the depending bars $i$, through said notches. A central perforation is formed in the hub $h$, of the clamping frame, and threaded to receive the clamping screw $m$, that is adapted for rotation with a lever by a cross-hole formation in its head $m'$, the pointed end of the screw being seated in a cupped cavity produced in the top wall of the cap-piece B, at a point which will represent the longitudinal center of the vessel A, so that the cap piece may be properly clamped in place upon said vessel as represented in Fig.

2. When the cooker is to be put into service, the ham or other meat is introduced within the vessel A, and the cap piece B, secured on the part A, by the clamping device, to effect which, the hooked bars $i$, are made to slide downwardly through the notches $c'$, in the depending flange $c$, and the clamping frame entire is sufficiently rotated to cause the hooks $i'$, to engage with this flange; when this is effected, the screw $m$ is adjusted with sufficient pressure to force the cap piece B, downwardly compressing the contents until its lower edge is seated closely upon the converged portion of the side wall of the vessel A, below the point $a$.

For the efficient operation of the device, it is advantageous to so proportion the capacity of the vessel and cap-piece, that the meat such as a ham or shoulder of pork, that is to be cooked, will nearly fill these portions of the receptacle when they are clamped together, the meat being compressed into form, and thus prevented from becoming loose while cooking, obviating the usual requirement of enveloping the meat with a cork jacket, and subsequently cording it to preserve its form. After the meat has been placed within the cooker as explained, the vessel A and cap-piece B, are completely submerged in water that is contained in a boiler C, of any preferred form, adapted to be seated over a fire. The water in the boiler, is now raised in temperature to the boiling point and is maintained thereat for a period of time that will insure the cooking of the meat within the cooker. There being no liquid introduced within the cooking device, the juices are not diluted, and the meat is cooked by the fat that escapes from it along with the natural liquid matter pervading the same.

In the use of the device for cooking meats, none of the aroma or characteristic flavor of the food article is lost, as no evaporation can take place, and when cooked the ham or other meat is rendered tender and rich in flavor without shrinkage in bulk, or closing its original form.

Having thus described my invention, what I claim as new, and desire to secure by Letters Patent, is—

1. In a cooker for meats, the combination with a vessel, of a hollow cap-piece adapted to slide part way within the vessel and form a liquid-tight joint therewith, and a clamping device for the vessel and its cap-piece, substantially as described.

2. In a cooker for meats, the combination with a vessel, partly cylindrical and partly coniform, of a hollow cap-piece which enters the cylindrical portion of the vessel and seats on its coniform wall, and a clamping device adapted to detachably connect the vessel and its cap-piece, substantially as described.

3. In a cooker for meats, the combination with a vessel dished in its bottom, flared on the side from the circular edge of said bottom for part of the vessel's height, terminating in a cylinder and an overhanging edge on the cylindrical part of the vessel, forming a depending short flange, notched at three points evenly divided, of a hollow cap-piece upwardly and laterally converged from its circular free edge, and adapted to seat within the chamber on its flared part, and a clamping device composed of a three armed frame, rods depending from the frame arms and having inwardly projected hooks on their lower ends, and a clamping screw penetrating the hubbed center of the clamping frame, substantially as described.

ADAM REUBOLD.

Witnesses:
WM. P. PATTON,
E. M. CLARK.